2,499,239

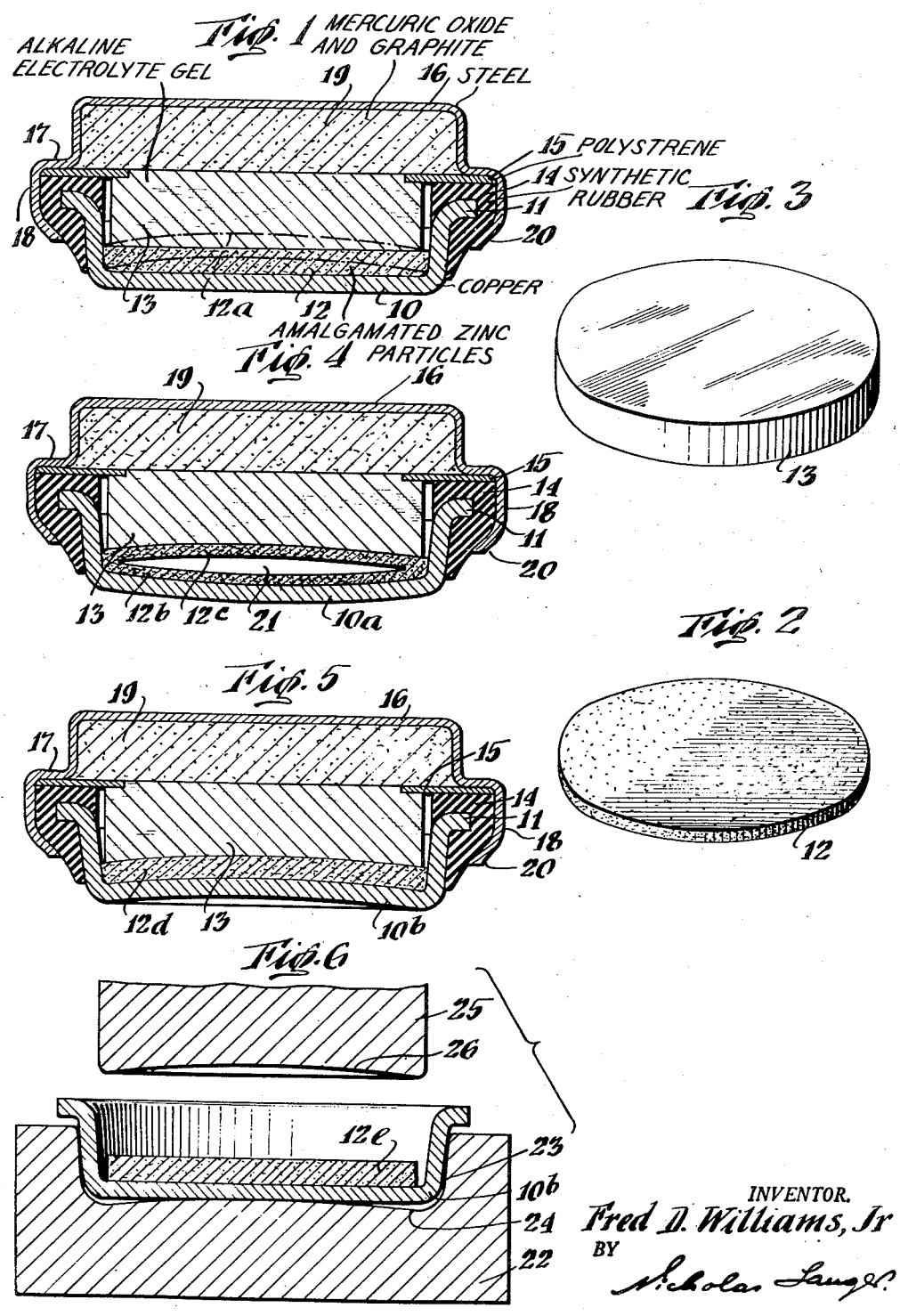
Feb. 28, 1950 — F. D. WILLIAMS, JR — 2,499,239
FLAT TYPE ALKALINE DRY CELL
Filed July 11, 1947
INVENTOR.
Fred D. Williams, Jr
BY
ATTORNEY Patented Feb. 28, 1950

UNITED STATES PATENT OFFICE 2,499,239

FLAT TYPE ALKALINE DRY CELL

Fred D. Williams, Jr., New Rochelle, N. Y., assignor to Samuel Ruben, New Rochelle, N. Y.

Application July 11, 1947, Serial No. 760,297

14 Claims. (Cl. 136—111)

This invention relates to alkaline dry cells and batteries and particularly applies to alkaline dry cells of flat construction such as are disclosed in U. S. Patent No. 2,422,045 dated June 10, 1947, to Samuel Ruben and in the co-pending applications of the said Samuel Ruben, Serial Nos. 671,200 and 682,734, filed May 21, 1946, and July 11, 1946, respectively.

An object of the invention is to improve alkaline dry cells and batteries.

Another object of the invention is to improve alkaline cells of flat construction, particularly cells of the described character employing an anode in the form of a pellet of compressed amalgamated zinc particles, a cathode containing an electrolytically-reducible oxygen-yielding compound, and an electrolyte comprising a self-supporting gel of an aqueous solution of an alkali metal hydroxide, initially containing a substantial quantity of alkali metal zincate.

Other and further objects and advantages of the present invention will become apparent from the following description, taken in conjunction with the accompanying drawing, in which:

Fig. 1 is a sectional view of a flat cell of the character described in the aforesaid Ruben patent and co-pending applications;

Fig. 2 is a perspective view of the anode of the said cell comprising a pellet of compressed amalgamated zinc particles;

Fig. 3 is a similar view of a gel electrolyte slug forming part of the cell shown in Fig. 1;

Fig. 4 is a sectional view of the cell shown in Fig. 1 and indicates certain structural changes which may occur during operation of the cell;

Fig. 5 is a similar view of an alkaline dry cell of flat construction embodying the principles of the invention; and Fig. 6 is a vertical view, somewhat fragmentary in character, illustrating one of the steps in the manufacture of the cell embodying the invention.

Referring now more particularly to Figs. 1 and 3 of the drawing, illustrating the present commercial form of flat alkaline cells, of the type disclosed in the aforesaid Ruben patent and patent applications reference numeral 10 denotes a shallow amalgamated metal cup or shell having an outwardly flared flange 11 at its edge and a layer 12 of amalgamated zinc particles compressed in the bottom thereof. Cup 10 is formed of a metal or alloy inert to the electrolyte and having a low potential with respect to zinc amalgam, such as magnesium, copper, or silver. Preferably, the zinc particles are first pressed into a thin pellet 12 (Fig. 2), having a diameter slightly smaller than that of cup 10. This pellet is placed on the bottom of the cup and is strongly compressed to have it conform to the inner surface of the cup and to form a strong bond of low electrical resistance therewith. Prior to assembly of the cell, the anode may be partially impregnated with liquid electrolyte.

The electrolyte layer is formed of a disc or slug 13 (Figs. 1 and 3) of a thick, self-sustaining gel formed of potassium hydroxide and zinc oxide dissolved in water, the solution being converted into a solid body of rubbery consistency by the addition of a suitable amount of sodium carboxy-methyl cellulose, starch or other suitable material. This electrolyte disc is laid on top of anode layer 12. A molded grommet 14 formed of a suitable elastomer, such as synthetic rubber, is fitted over the bottom free edge 11 of cup 10. A ring 15 of relatively impervious sheet material, such as polystyrene film, is laid on the upper face of the grommet and electrolyte disc. This ring extends from the outer edge of the grommet in over the edge of electrolyte disc 13 for a distance of 10 to 30% of the radius of the disc, and seals itself to the surface of the electrolyte disc.

The cathode member is compressed in the bottom of a shallow cup 16 of ferrous metal, such as iron or steel, whose edge is formed with a flange having a flat circular portion 17 and a cylindrical portion 18 capable of fitting over the outer periphery of grommet 14. A layer 19 of the cathode-depolarizer composition is pressed into cup 16 to the level of flange portion 17. The preferred composition is formed of finely divided mercuric oxide intimately mixed with 5% to 10% of micronized graphite.

The assembly is completed by placing the cathode member down over the anode-electrolyte assembly and spinning in the edge 20 of flange 18 to compress the grommet and seal the cell. The spacing between anode and cathode is slightly less than the original thickness of electrolyte gel disc 13 so that pressure is applied thereto.

In order to avoid generation of gas after the depolarizer has been consumed, it is desirable to balance the quantity of zinc in the anode with respect to the quantity of oxygen available in the cathode of depolarizer material so that the zinc is used up before, or substantially at the same time, as the depolarizer. This combination avoids the necessity of providing venting means and eliminates bulging of the cells caused by end-of-life gas pressure.

Cells of the described character possess excellent characteristics and are capable of delivering relatively heavy currents for long periods of time at a voltage which decreases only slightly throughout the useful life of the cell. Also, the cells are characterized by extremely long shelf life and are not detrimentally affected by adverse atmospheric conditions, such as high temperature and humidity. However, the use of pressed zinc amalgam powder anodes in dry alkaline cells gives rise to certain problems not encountered with other anode constructions. These problems are primarily related to the increase in volume of the amalgamated zinc powder during operation of the cell. Zinc amalgam anodes after use average twice the volume of the original pellet although this volumetric increase may be somewhat more or less than 100% depending on exact cell conditions.

Cell designs using pressed zinc amalgam powder anodes must provide for this increase in volume but flat cell assemblies of the character described in the foregoing must also allow for a secondary factor resulting from this volumetric increase. These flat cell assemblies comprise anode pellets of relatively large diameter referred to the thickness and the volumetric increase of the anode surface nearest the depolarizer produces a bowing effect similar to that of a bimetallic element under the influence of heat. In other words, as the anode pellet is used, the surface nearest the depolarizer expands and tends to bow the whole pellet towards the depolarizer. As a result, the pellet will assume the bowed shape indicated in dotted lines in Fig. 1 and denoted by reference numeral 12a.

I have discovered that this bowing of the anode pellet is not detrimental to normal cell operation and in fact is beneficial in that it assures positive contact between the anode pellet 12 and the electrolyte disc 13 throughout the useful life of the cell. This is particularly important in view of the normal shrinkage of the electrolyte gel disc 13 occurring during operation of the cell. Bowing and expansion of the anode pellet compensates for the shrinkage of the gel disc and assures maintenance of contact between the anode and the electrolyte.

I have also found that the ease and regularity of producing this bowed section of the anode pellet is influenced considerably by the cell elements. Thus, by carefully examining defective cells, I found that a slight distortion of the anode cup is frequently caused during assembly and crimping of the cell, rendering the inner surface of the anode cup slightly concave. This condition is illustrated at 10a in Fig. 4 in which a cell similar to that of Fig. 1 is shown and similar reference numerals are used to denote corresponding parts. The concave surface formation of cup 10a causes the unused portion 12b of the zinc amalgam powder to resist bowing, while the used portion 12c tends to be bowed or distorted in the usual manner. The operation of a cell of this type is apt to be quite erratic. In some cases a split 21 (Fig. 4) may develop between the used and the unused portions of the anode pellet, rendering the cell completely inoperative. Even in the cases where the detrimental distortion of the anode cup is insufficient to cause operative difficulties, the bowing of the anode pellet is reduced to the point where the initial volume of the gel electrolyte disc becomes quite critical and must be held at or near the full volume available in the cell. This, of course, introduces considerable difficulties in the manufacture of cells on a quantity production scale.

According to the principles of the present invention, the foregoing difficulty is completely eliminated by providing a preliminary distortion of the anode pellet so that it is slightly bowed and rendered convex on its side that faces the disc of gel electrolyte. This is best accomplished by slightly deforming the anode cup before or after the introduction of the anode pellet so as to make its inner surface moderately convex. Experiments have demonstrated that this predistortion establishes such initial conditions that the subsequent expansion of the anode pellet produces distortion in the proper direction, that is bowing the pellet towards the electrolyte disc. Cells prepared in accordance with these principles gave the most consistent and uniformly satisfactory results.

Fig. 5 illustrates an improved cell embodying the invention. It will be noted that the structural organization of this cell is identical with that of the cells shown in Figs. 1 and 4 and for this reason similar reference numerals have been used to denote corresponding parts. The difference resides in the slight predistortion of anode cup 10b which is given an inwardly convex shape, imparting a similar shape to anode pellet 12d accurately conforming to the inner surface of the cup. Experiments have demonstrated that the predistortion may be quite small. For example, it has been found that a distortion as little as 0.010" at the center of a 1¼" diameter cell is sufficient to provide the desired effect.

The preferred method by which the desired predistortion of the anode cup and slight inward bowing of the anode pellet may be obtained will be best understood from Fig. 6. Reference numeral 22 denotes a lower die having a recess 23 provided therein which generally conforms to the original shape of the anode cup 10b with the exception of its bottom surface 24 which is slightly convex inwardly. Recess 23 in die 22 is adapted to cooperate with a generally cylindrical punch 25 having a slightly concave bottom surface 26 conforming to the convex surface 24 of the recess.

When practicing the method of the invention, a preformed pellet 12e of amalgamated zinc particles is inserted into the cup 10b. This pellet has a diameter slightly smaller than that of the anode cup and has plane parallel spaced top and bottom surfaces so that it will rest on the initially plane bottom surface of the cup. Upon punch 25 being pressed against the top surface of pellet 12e, the cup will be predistorted to the desired extent. At the same time, the particles of the pellet will be caused to flow under the pressure and will be consolidated to a shape conforming to the inwardly bowed shape of the cup. A strong mechanical bond of low electrical resistance will be formed between the slightly inwardly bowed pellet and the inner surface of the anode cup thereby obtaining the initial structural conditions necessary for proper and trouble-free cell operation.

The anode subassembly thus prepared is now ready for the usual assembly operations described more fully in the foregoing.

Cells prepared in accordance with the principles of the invention positively eliminate the disadvantages and inconveniences which may otherwise occur as a result of the expansion of the anode pellet during operation of the cell. Another important advantage is that cells embodying the invention require less critical control of the electrolyte content. The gel electrolyte disc or slug shrinks during operation of the cell due to electrolysis, which in turn causes expansion and bowing of the anode pellet due to gradual conversion of the zinc to zinc hydroxide. By providing uniform bowing of the anode pellet in excess of the normal shrinkage of the electrolyte gel disc, contact of the anode pellet with the electrolyte can be positively maintained throughout the useful life of the cell regardless of the exact initial gel volume.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A primary dry cell comprising, in combination, anode and cathode shells held in insulative sealing relation, a cathode of depolarizer material in said cathode shell, an anode constituted by a solid body of compressed amalgamated zinc particles in said anode shell, said body having a preformed slightly convex operative surface and having substantially all of its opposite surface in pressure contact with the inner surface of said anode shell, and a deformable body of electrolyte of substantially solid consistency interposed between and in contact with said cathode and the convex surface of said anode.

2. An alkaline dry cell comprising, in combination, anode and cathode shells held in insulative sealing relation, a cathode of depolarizer material in said cathode shell, an anode of a solid body of compressed amalgamated zinc particles in said anode shell, said body having a preformed slightly convex operative surface and having substantially all of its opposite surface in pressure contact with the inner surface of said anode shell, and a body of alkaline electrolyte gel interposed between and in contact with said cathode and the convex surface of said anode.

3. A sealed alkaline primary cell comprising, in combination, a porous coherent anode compressed from amalgamated zinc particles, a cathode formed of a coherent conductive body containing an electrolytically reducible oxygen-yielding compound, a gelled body of alkali metal hydroxide electrolyte interposed between and in contact with said anode and cathode, and an airtight enclosure including anode and cathode terminal members for said cell, said anode having a preformed slightly convex surface cooperating with said body of electrolyte and having substantially all of its opposite surface in pressure contact with the inner surface of the said anode terminal member.

4. A sealed alkaline primary cell comprising, in combination, a porous coherent anode compressed from amalgamated zinc particles, a cathode formed of a coherent conductive body containing an electrolytically reducible oxygen-yielding compound, a gelled body of alkali metal hydroxide electrolyte initially having a substantial quantity of zinc dissolved therein interposed between and in contact with said anode and cathode, and an airtight enclosure including anode and cathode terminal members for said cell, said anode having a preformed slightly convex surface cooperating with said body of electrolyte and having substantially all of its opposite surface in pressure contact with the inner surface of the said anode terminal member.

5. A sealed alkaline primary cell comprising, in combination, a porous anode comprising compressed amalgamated zinc particles, a cathode of depolarizer material formed of a coherent conductive body containing an electrolytically reducible oxygen-yielding compound, a body of alkali metal hydroxide electrolyte gel initially containing a substantial quantity of zincate interposed between and in contact with said anode and said cathode, and metallic terminal members for said cell in respective contact with said anode and said cathode, said terminal members being mechanically joined but electrically disconnected and jointly constituting an airtight enclosure for said cell and said anode having a preformed slightly convex surface cooperating with said body of electrolyte and having substantially all of its opposite surface in pressure contact with the said anode terminal member.

6. A dry primary cell comprising, in combination, a cathode terminal shell having therein a coherent conductive cathode containing an oxygen-yielding depolarizing compound, an anode terminal shell having therein a porous coherent anode of amalgamated zinc, an immobilized body of alkali metal hydroxide electrolyte initially containing a substantial quantity of alkali metal zincate interposed between and in contact with said cathode and anode, and means for holding said shells in insulative sealing relation with respect to each other, said anode terminal shell being preformed to present a slightly convex inner surface of the coherent anode body for cooperation with the body of electrolyte.

7. A dry primary cell comprising, in combination, a cathode shell having compressed therein a depolarizer comprising a body of reducible metal oxide, an anode terminal shell having compressed therein a porous coherent anode of amalgamated zinc particles, a body of alkali metal hydroxide electrolyte gel initially containing a substantial quantity of alkali metal zincate interposed between and in contact with said cathode and anode, and elements for holding said shells in insulative airtight sealing relation with respect to each other, said anode shell being composed of a metal inert to the electrolyte having low potential to zinc amalgam and being preformed to present an inwardly convex surface to which the surface of the anode will conform whereby such convex surface of the porous anode will be retained throughout the operative life of the cell and separation of the used and unused portions of the anode is effectively prevented.

8. A sealed alkaline primary cell comprising, in combination, a dished cathode shell having compressed therein a coherent conductive cathode body containing an electrolytically dissociable oxygen-yielding compound, a dished anode shell of a metal selected from the group consisting of magnesium, copper and silver, having a slightly convex inner surface, a porous coherent anode of amalgamated zinc particles compressed in said anode shell and presenting a convex exposed surface, a body of alkali metal hydroxide gel initially containing a substantial quantity of alkali metal zincate interposed between and in contact with said cathode and with the convex face of said anode, and an insulative gasket compressed between cooperating terminal regions of said cathode and anode shells and airtightly sealing said cell, the amount of zinc in said anode being substantially electrochemically equivalent to the depolarizing capacity of said cathode.

9. A dry primary cell comprising, in combination, a dished cathode terminal shell having compressed therein a cathode of depolarizer material comprising an electronically-conducting electrolytically reducible metal oxide intimately mixed with finely divided inert material of higher conductivity, a dished anode terminal shell having a slightly convex inner surface, a porous coherent anode of amalgamated zinc particles compressed in said anode shell and having its exposed surface generally conforming to the surface of said shell, a gelled body of alkali metal hydroxide electrolyte initially containing a substantial quantity of alkali metal zincate interposed between and in contact with said cathode and said anode, and an insulative gasket compressed between cooperating portions of said cathode and anode shells and airtightly sealing said cell.

10. A dry primary cell comprising, in combination, a dished steel cathode shell having compressed therein a cathode of depolarizer material comprising mercuric oxide mixed with a smaller amount of micronized graphite, a dished anode terminal shell of a metal selected from the group consisting of magnesium, copper and silver having a slightly convex inner surface, a porous coherent anode of amalgamated zinc compressed in said anode shell and having a convex exposed surface generally conforming to the convex surface of said shell, an immobilized body of electrolyte composed of potassium hydroxide and zinc oxide containing a sufficient amount of sodium-carboxyl-methyl cellulose to impart thereto a gel consistency interposed between and in contact with said cathode and anode, and an insulative gasket compressed between cooperating terminal regions of said cathode and anode shells and airtightly sealing said cell, the slightly convex surface of said anode being effective in maintaining contact with the gelled body of electrolyte throughout the useful life of the cell when the said anode will expand and the said electrolyte will shrink.

11. An alkaline dry cell comprising, in combination, a cathode shell containing a cathode of depolarizer material, an anode shell of slightly convex inner surface containing an anode of compressed amalgamated zinc particles conforming to the shell and having a similarly convex operative surface, and a body of alkaline electrolyte gel initially containing a substantial quantity of zincate interposed between and in contact with said cathode and the convex surface of said anode.

12. The method of making an anode subassembly for alkaline dry cells which comprises introducing a pressed anode pellet of amalgamated zinc particles into an anode terminal shell, and pressing complementary convex and concave surfaces against said shell and said pellet, respectively, to consolidate the pellet and to impart an inwardly convex surface to said shell and to said pellet.

13. The method of making an anode subassembly for alkaline dry cells which comprises placing a pressed plane anode pellet of amalgamated zinc particles into a shallow anode cup initially having a plane inner surface, and pressing complementary convex and concave surfaces against said cup and said pellet respectively, to deform said cup and to consolidate said pellet thereby to impart a convex shape to the inner surface of the cup and a similar shape to the exposed surface of the consolidated pellet.

14. An alkaline dry cell comprising, in combination, a cathode shell containing a cathode of depolarizer material, an anode shell of slightly convex inner surface containing an anode of compressed amalgamated zinc particles having a surface conforming to the shell and having a similarly convex operative surface, and a body of alkaline electrolyte gel interposed between and in contact with said cathode and the convex surface of said anode.

FRED D. WILLIAMS, Jr.

REFERENCES CITED

The following references are of record in the file of this patent:

UNITED STATES PATENTS

| Number | Name | Date |
|---|---|---|
| 627,917 | Fuld | June 27, 1899 |

FOREIGN PATENTS

| Number | Country | Date |
|---|---|---|
| 548,808 | France | Nov. 2, 1922 |